(12) United States Patent
Nishihara

(10) Patent No.: US 12,722,406 B2
(45) Date of Patent: Sep. 1, 2026

(54) IMAGE FORMING CONTROL METHOD AND IMAGE FORMING APPARATUS

(71) Applicant: KYOCERA Document Solutions Inc., Osaka (JP)

(72) Inventor: Masaaki Nishihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 154 days.

(21) Appl. No.: 18/758,599

(22) Filed: Jun. 28, 2024

(65) Prior Publication Data

US 2025/0010639 A1 Jan. 9, 2025

(30) Foreign Application Priority Data

Jul. 7, 2023 (JP) ................................ 2023-111859

(51) Int. Cl.
*B41J 11/00* (2006.01)
*H04N 1/60* (2006.01)

(52) U.S. Cl.
CPC ...... *B41J 11/0095* (2013.01); *B41J 11/00242* (2021.01); *H04N 1/6033* (2013.01)

(58) Field of Classification Search
CPC .. B41J 11/0095; B41J 11/00242; B41J 3/445; B41J 2/2103; B41J 3/60; B41J 11/00222; B41J 13/009; H04N 1/6033; H04N 1/00734; H04N 1/00748; H04N 1/00774
See application file for complete search history.

(56) References Cited

FOREIGN PATENT DOCUMENTS

| | | | | |
|---|---|---|---|---|
| EP | 3753740 A1 * | 12/2020 | | ......... H04N 1/00687 |
| JP | 2020116885 A | 8/2020 | | |

OTHER PUBLICATIONS

Nishihara, "Image Forming Apparatus and Method for Controlling Image Forming Apparatus" (EP 3753740 A1), Dec. 23, 2020, [Paragraphs 0016-0094] (Year: 2020).*

* cited by examiner

*Primary Examiner* — Lisa Solomon
(74) *Attorney, Agent, or Firm* — Alleman Hall LLP

(57) ABSTRACT

A processor causes a sheet conveying device to execute a process of conveying a target sheet in a state in which a specific surface on which a first test image including a plurality of black patch images arranged in a stepwise manner is formed serves as a printing surface. The processor supplies data of a second test image including a plurality of line segment images corresponding to the plurality of black patch images to an image processing device as reference image data, and acquires information on a test interference position, which is a position where a second test image interferes with a mask area corresponding to the plurality of black patch images. The processor sets a reference center position according to the test interference position.

3 Claims, 9 Drawing Sheets

G1
9a
9x
L1
G110
PC1
D1
D2
G11

G1
G2
L2
G110
G210
PC1
D1
D2
G21
G11

G2
9x
9a
G1
Px1
G110
G210
G21
G11
D1
D2

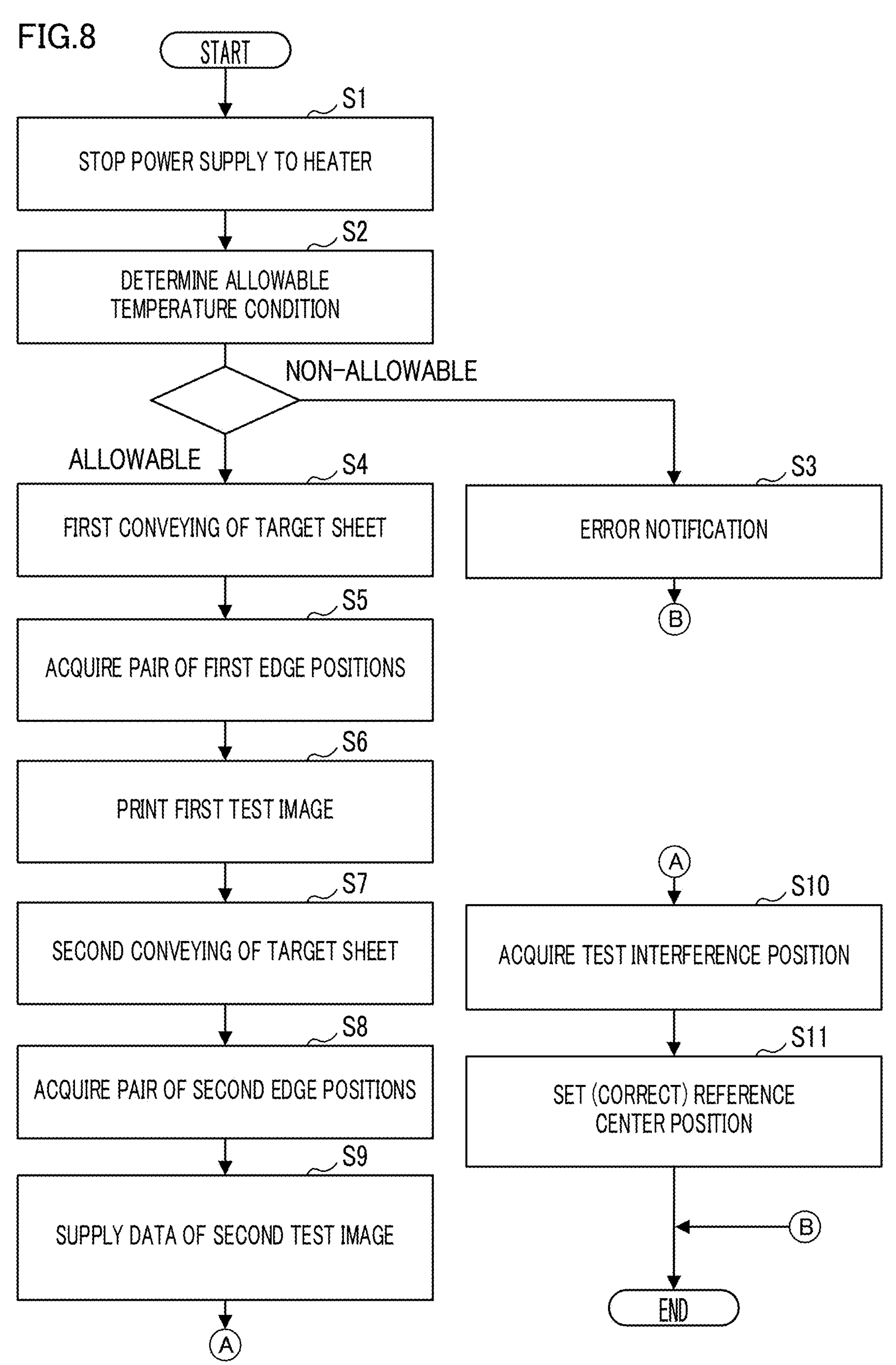
FIG.8
START
S1
STOP POWER SUPPLY TO HEATER
S2
DETERMINE ALLOWABLE TEMPERATURE CONDITION
NON-ALLOWABLE
ALLOWABLE
S4
FIRST CONVEYING OF TARGET SHEET
S3
ERROR NOTIFICATION
B
S5
ACQUIRE PAIR OF FIRST EDGE POSITIONS
S6
PRINT FIRST TEST IMAGE
S7
SECOND CONVEYING OF TARGET SHEET
S8
ACQUIRE PAIR OF SECOND EDGE POSITIONS
S9
SUPPLY DATA OF SECOND TEST IMAGE
A
A
S10
ACQUIRE TEST INTERFERENCE POSITION
S11
SET (CORRECT) REFERENCE CENTER POSITION
B
END

IMAGE FORMING CONTROL METHOD AND IMAGE FORMING APPARATUS

INCORPORATION BY REFERENCE

This application is based upon and claims the benefit of priority from the corresponding Japanese Patent Application No. 2023-111859 filed on Jul. 7, 2023, the entire contents of which are incorporated herein by reference.

BACKGROUND

The present disclosure relates to an image forming control method and an image forming apparatus capable of adjusting a position of a print target image according to a detection result of positions of edges at both ends in a width direction of a sheet being conveyed.

The image forming apparatus may include an edge detection portion that is able to detect positions of both ends in the width direction of the sheet being conveyed. The edge detection portion is arranged on an upstream side of a printing device in a sheet conveying direction.

An image forming apparatus is known in which the image forming apparatus specifies a sheet center position that is a center position in the width direction of the sheet based on a detection result of the edge detection portion, and adjusts the position of the print target image in the width direction according to the sheet center position (for example, refer to Patent Document 1).

Furthermore, an image forming apparatus is known in which the image forming apparatus forms test images including a plurality of scale images on both surfaces of a sheet in order to correct deviation of the center position in the width direction in an edge detection area. In this case, the image forming apparatus corrects the deviation of the center position of the edge detection area according to an overlapping state of the plurality of scale images on both surfaces of the sheet when the sheet is transparentized.

The overlapping state of the plurality of scale images on both surfaces of the sheet is visually confirmed.

SUMMARY

The image forming control method according to an aspect of the present disclosure is a method of controlling an image forming apparatus. The image forming apparatus includes a sheet conveying device, a printing device, a black reference member, an image sensor unit, and an image processing device. The sheet conveying device conveys a sheet along a conveying path. The printing device forms an image on the sheet conveyed along the conveying path. The black reference member has a black reference surface arranged along a width direction crossing a sheet conveying direction and faces a detection area on an upstream side in the sheet conveying direction with respect to the printing device in the conveying path. The image sensor unit is arranged along the width direction in a state of facing the reference surface through the detection area, emits detection light toward the reference surface and detects an amount of reflected light of the detection light, and outputs a plurality of line image data each including a plurality of pixel data representing detected light amounts corresponding to a plurality of unit areas divided in the width direction in the detection area. The image processing device executes image processing based on the plurality of line image data. The image processing device is capable of executing an area detection process of detecting a pair of lateral edge positions that are positions of both ends in the width direction of the sheet passing through the detection area, a sheet area that is an area within a rectangular outline of the sheet, and a mask area that is a portion of the sheet area where the detected light amount is lower than a reference light amount. The image processing device is further capable of executing an interference position specifying process for specifying a position of an interference portion that overlaps with the mask area in a reference image represented supplied reference image data. The image forming control method includes a processor, when an operation mode is a first mode, causing the sheet conveying device to execute a first conveying process of conveying a target sheet in a state where a specific surface of the target sheet serves as a printing surface. The image forming control method further includes the processor acquiring information on a pair of first lateral edge positions that are the pair of lateral edge positions detected by the image processing device when the first conveying process is being executed. The image forming control method further includes the processor causing the printing device to execute a process of forming a first test image including a plurality of black patch images on the specific surface when the first conveying process is being executed. The image forming control method further includes the processor causing the sheet conveying device to execute a second conveying process of conveying the target sheet with the specific surface on which the first test image is formed as a printing surface. The image forming control method further includes the processor acquiring information on a pair of second lateral edge positions that are the pair of lateral edge positions detected by the image processing device when the second conveying process is being executed; The image forming control method further includes the processor supplying second test image data, which corresponds to the plurality of black patch images and includes a plurality of line segment images each along the sheet conveying direction, to the image processing device as the reference image data, and acquiring information on a test interference position that is a position of the interference portion specified by the image processing device based on the mask area corresponding to the second conveying process and data of the second test image. The image forming control method further includes the processor setting a reference center position that is a center position of the image sensor unit in the width direction according to the test interference position. The image forming control method further includes the processor, when the operation mode is a second mode, executing a width position correction process of correcting a position in the width direction of a print target image each time the sheet is conveyed according to a difference between a center position of the pair of lateral edge positions detected by the image processing device each time the sheet is conveyed and the reference center position. The image forming control method further includes the processor supplying data of the print target image that has been subjected to the width position correction process to the image processing device as the reference image data, and executing a mask process in which pixels corresponding to the position of the interference portion identified by the image processing device in the print target image are replaced with non-print pixels. The image forming control method further includes the processor causing the printing device to execute a process of forming the print target image, which has been subjected to the width position correction process and the mask process, on the sheet. The plurality of black patch images in the first test image are arranged at a pitch of a reference length in the width direction with respect to the center position of the pair of first lateral edge positions in a state in which the positions in the sheet conveying direction are sequentially deviated, and are rectangular black-painted images arranged in a stepwise manner, each having a width equal to the reference length. The plurality of line segment images in the second test image are arranged at regular intervals smaller than the reference length in the width direction with respect to the center position of the pair of second lateral edge positions, and an end portion of each of the plurality of line segment images is formed at a position overlapping a corresponding one of the plurality of black patch images in the sheet conveying direction.

The image forming apparatus according to another aspect of the present disclosure includes the sheet conveying device, the printing device, the black reference member, the image sensor unit, the image processing device, and the processor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a flowchart showing an example of a procedure of a center position calibration process in an image forming apparatus according to an embodiment.

DETAILED DESCRIPTION

Figure 1:
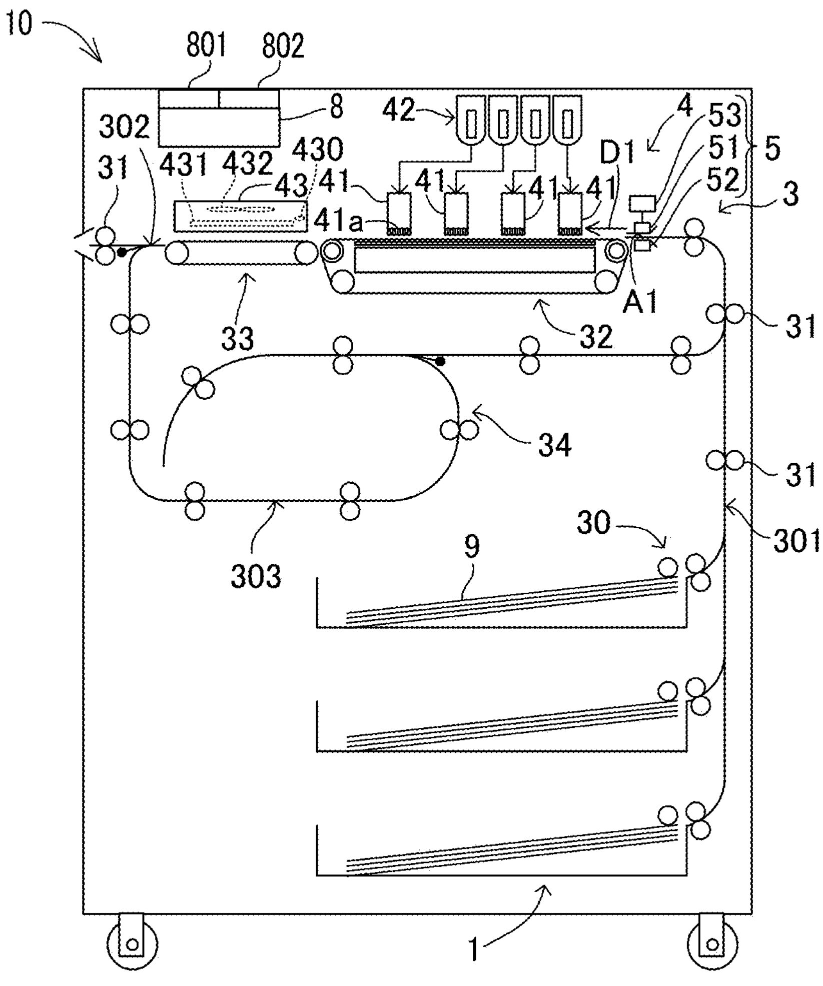
FIG. 1 is a configuration diagram of an image forming apparatus according to an embodiment.

Embodiments according to the present disclosure will be described below with reference to the drawings. Note that the following embodiments are examples of embodying a technique according to the present disclosure, and do not limit the technical scope of the present disclosure.

[Configuration of the Image Forming Apparatus 10]

The image forming apparatus 10 according to an embodiment includes a sheet storing portion 1, a sheet conveying device 3, and a printing device 4.

The sheet conveying device 3 includes a sheet feeding mechanism 30, a plurality of conveying roller pairs 31, a first belt conveying device 32, and a second belt conveying device 33. The sheet feeding mechanism 30 feeds a sheet 9 in the sheet storing portion 1 to a main conveying path 301.

Some of the plurality of conveying roller pairs 31 convey the sheet 9 along the main conveying path 301 and further feeds the sheet 9 to the first belt conveying device 32.

The first belt conveying device 32, taking over from the plurality of conveying roller pairs 31, conveys the sheet 9 and feeds the sheet 9 to the second belt conveying device 33. The second belt conveying device 33, taking over from the first belt conveying device 32, conveys the sheet 9 and further feeds the sheet 9 to a subsequent conveying path 302.

Part of the plurality of the conveying roller pairs 31 convey the sheet 9 along the subsequent conveying path 302, and further feed the sheet 9 to a subsequent portion. For example, the subsequent portion is a discharge tray, a post-processing device, or the like.

In addition, part of the plurality of conveying roller pairs 31 may convey the sheet 9 from the subsequent conveying path 302 to a reverse conveying path 303. The sheet conveying device 3 also includes a reversing mechanism 34 in the reverse conveying path 303 that reverses the sheet 9 and returns the sheet to the main conveying path 301.

Each of the main conveying path 301, the subsequent conveying path 302, and the reverse conveying path 303 is a part of a conveying path of the sheet 9. In addition, belts in each of the first belt conveying device 32 and the second belt conveying device 33 are also part of the conveying path of the sheet 9.

The printing device 4 executes a printing process on the sheet 9 conveyed by the first belt conveying device 32. The printing process is a process of forming an image on the sheet 9.

In the present embodiment, the printing device 4 executes the printing process using an inkjet method. That is, the printing device 4 forms an image on the sheet 9 by ejecting ink onto the sheet 9. The ink is an example of a developing agent.

The printing device 4 includes a plurality of ink heads 41 and a plurality of ink supply portions 42, each corresponding to a different color of ink. More specifically, the printing device 4 includes four ink heads 41 and four ink supply portions 42 corresponding to yellow, magenta, cyan, and black.

Each of the plurality of ink heads 41 has a plurality of ejection nozzles **41*a* that eject ink. The plurality of ink heads 41 are fixed at positions facing the conveying belt of the first belt conveying device 32. The plurality of ink supply portions 42 each contain ink of a different color, and supply the ink to the plurality of ink heads 41**.

Note that a device that executes the printing process using another method such as an electrophotographic method may be employed as the printing device 4.

The first belt conveying device 32 conveys the sheet 9 on which the image is formed to the second belt conveying device 33.

The printing device 4 forms an image on the first surface of the sheet 9 when the sheet 9 is conveyed for the first time by the first belt conveying device 32. The printing device 4 forms an image on the second surface of the sheet 9 when the sheet 9 that has passed through the reverse conveying path 303 is conveyed for the second time by the first belt conveying device 32.

In FIGS. 1, 3 to 5, a conveying direction D1 is the sheet conveying direction. The sheet conveying direction is a direction in which the sheet 9 is conveyed by the sheet conveying device 3. A width direction D2 is a direction crossing the conveying direction D1. The width direction D2 is a main scanning direction in the printing process, and the conveying direction D1 is a sub-scanning direction in the printing process.

The printing device 4 further includes a drying device 43 having a heater 431 that heats the sheet 9. The drying device 43 is arranged on a downstream side of the printing device 4 in the conveying direction D1.

The drying device 43 has the heater 431 that heats the sheet 9. The drying device 43 dries the ink on the sheet 9 conveyed by the second belt conveying device 33.

The drying device 43 further includes a fan 432. The fan 432 sends air heated by the heater 431 to the sheet 9 on the second belt conveying device 33. Furthermore, the drying device 43 includes a temperature sensor 430 that detects a temperature inside the drying device 43.

The image forming apparatus 10 further includes an operation device 801, a display device 802, and a control device 8 (see FIG. 1).

The operation device 801 detects a human operation. For example, the operation device 801 includes a plurality of operation buttons and a touch panel. The display device 802 can display various types of information. For example, the display device 802 is a panel display device such as a liquid crystal display panel.

Figure 2:
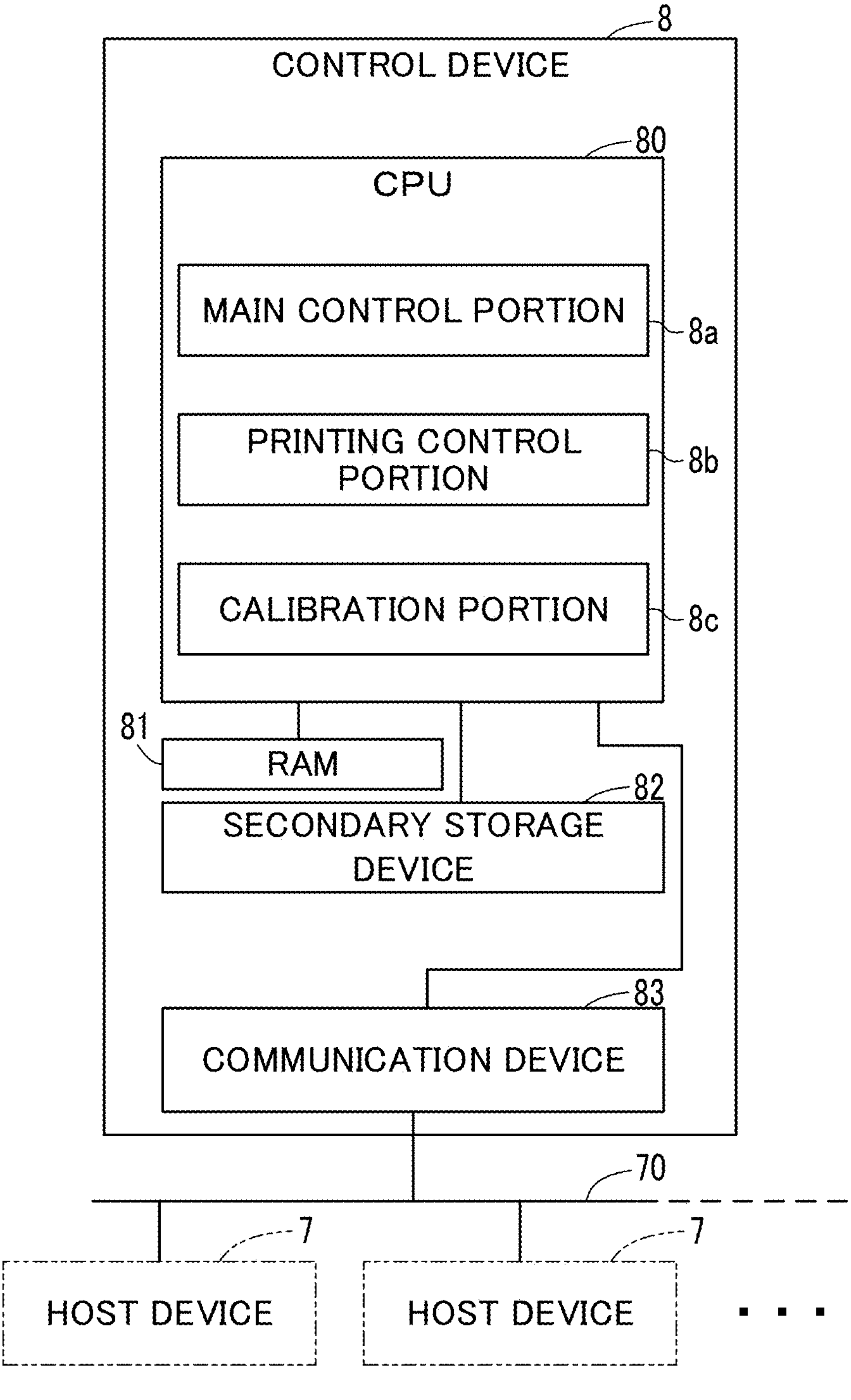
FIG. 2 is a block diagram showing a configuration of a control device in an image forming apparatus according to an embodiment.

As shown in FIG. 2, the control device 8 includes a central processing unit (CPU) 80, a random access memory (RAM) 81, a secondary storage device 82, a communication device 83, and the like.

The CPU 80 performs various types of controls and data processing by executing a computer program. The RAM 81 temporarily stores the computer program executed by the CPU 80 and various types of data.

The secondary storage device 82 is a computer-readable nonvolatile storage device. The secondary storage device 82 stores the computer program executed by the CPU 80 and various types of data. For example, one or both of a flash memory or a hard disk drive may be employed as the secondary storage device 82.

The communication device 83 executes communication with other devices such as a host device 7 via a network 70. The CPU 80 executes communication with other devices via the communication device 83. The host device 7 is an information processing apparatus that requests the image forming apparatus 10 to perform a printing process.

The CPU 80 includes a plurality of processing modules achieved by executing the computer program. The plurality of processing modules include a main control portion 8*a*, a printing control portion 8*b*, and the like (see FIG. 2).

The main control portion 8*a* executes a start control or the like to start various types of processes in response to an operation on the operation device 801 or a processing request received via the communication device 83.

The printing control portion 8*b* controls the sheet conveying device 3 and the printing device 4. The printing control portion 8*b* controls the conveying of the sheet 9 by controlling the sheet conveying device 3.

In addition, the printing control portion 8*b* causes the printing device 4 to execute the printing process in synchronization with the conveying of the sheet 9. Further, the printing control portion 8*b* executes control to supply electric power to the heater 431 of the drying device 43 and control to operate the fan 432 when the printing process for the print target image is executed.

Figure 3:
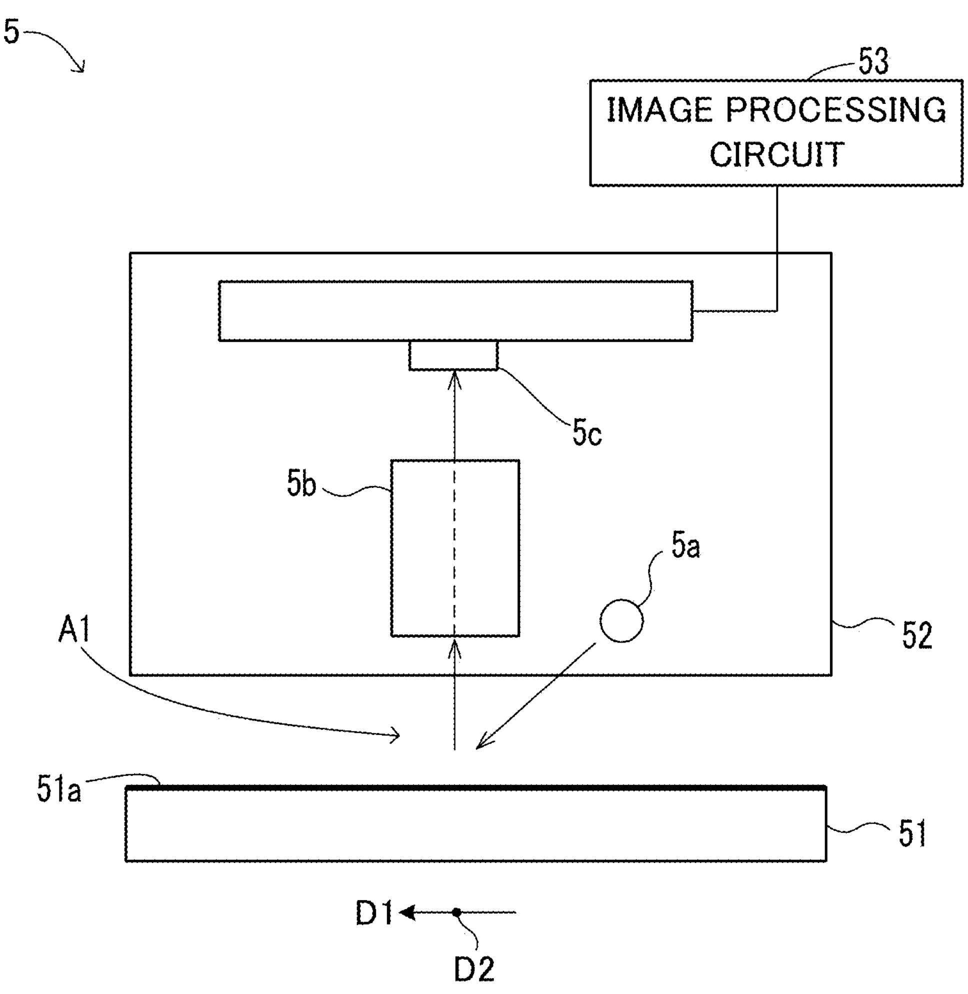
FIG. 3 is a configuration diagram of a sheet measuring device in an image forming apparatus according to an embodiment.
Figure 4:
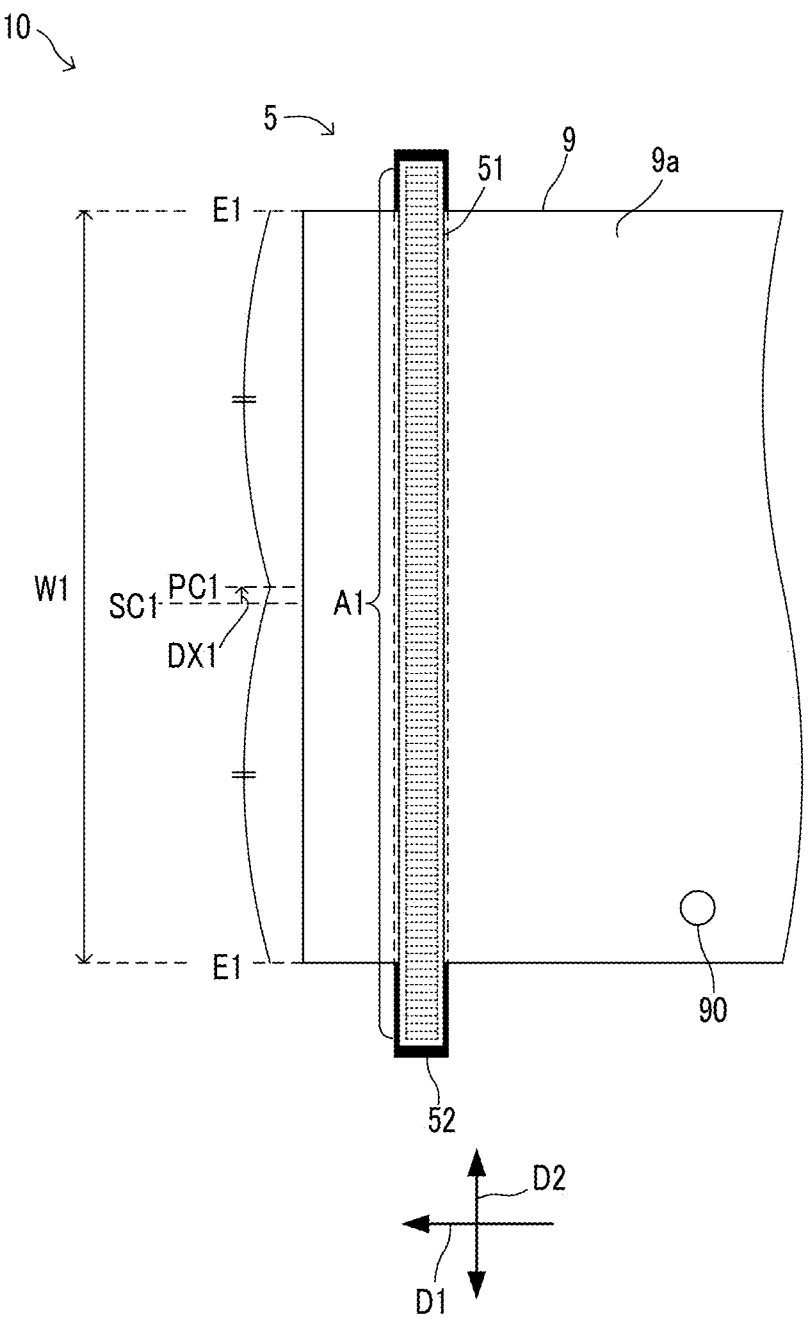
FIG. 4 is a plan view of an image sensor unit and a black reference member included in a sheet measuring device of an image forming apparatus according to an embodiment.

The image forming apparatus 10 further includes a sheet measuring device 5 (see FIGS. 1, 3 and 4). The sheet measuring device 5 is arranged on an upstream side of the printing device 4 in the conveying direction D1.

In the following description, an area corresponding to the sheet measuring device 5 in the main conveying path 301 will be referred to as a detection area A1 (see FIGS. 1, 3, and 4). The detection area A1 is an area on an upstream side of the printing device 4 in the conveying direction D1 (see FIG. 1).

[Configuration of the Sheet Measuring Device 5]

The sheet measuring device 5 includes a black reference member 51, an image sensor unit 52, and an image processing circuit 53 (see FIGS. 1 and 3).

The black reference member 51 and the image sensor unit 52 are each arranged along the width direction D2 (see FIG. 4). The black reference member 51 and the image sensor unit 52 are arranged to face each other across the detection area A1 (see FIGS. 1 and 3).

The black reference member 51 has a black reference surface 51*a* (see FIG. 3). The reference surface 51*a* is arranged along the width direction D2, in a state of facing the detection area A1.

The image sensor unit 52 is arranged along the width direction D2 in a state of facing the reference surface 51*a* via the detection area A1 (see FIGS. 3 and 4). The image sensor unit 52 includes a light emitting portion 5*a*, a lens 5*b*, and an image sensor 5*c* (see FIG. 3).

The light emitting portion 5*a* emits a detection light toward the reference surface 51*a*. The lens 5*b* focuses reflected light of the detection light onto a light receiving portion of the image sensor 5*c*.

The image sensor 5*c* is a line sensor having a plurality of photoelectric conversion elements arranged along the width direction D2. The image sensor 5*c* detects an amount of the reflected light and sequentially outputs a plurality of line image data each including a plurality of pixel data.

The plurality of pixel data represent the amount of detected light corresponding to a plurality of unit areas divided in the width direction D2 in the detection area A1. The plurality of image data indicates the amount of light received by the plurality of photoelectric conversion elements.

The plurality of unit areas are areas in which the detection area A1, whose longitudinal direction is the width direction D2, is divided at a predetermined resolution. A reference center position SC1 is a position corresponding to one specific piece of data of the plurality of pixel data of each of the line data.

All of the plurality of pixel data in each of the line image data obtained when the sheet 9 is not present in the detection area A1 represents the amount of light of reflected light on the reference surface 51*a*, and is data that is less than a predetermined reference amount of light.

On the other hand, in each of the line image data obtained when the sheet 9 passes through the detection area A1, the data in an area corresponding to the width of the sheet 9 among the plurality of pixel data is luminance data according to a state of the surface of the sheet 9.

The image processing circuit 53 is a device that achieves image processing based on the plurality of line data using hardware. For example, the image processing circuit 53 is configured by an application specific integrated circuit (ASIC), a digital signal processor (DSP), or the like. The image processing circuit 53 is an example of an image processing device.

The image processing circuit 53 is able to execute an area detection process and an interference position specifying process based on the plurality of line image data sequentially output from the image sensor unit 52.

The area detection process is a process of detecting a pair of lateral edge positions E1, a sheet area, and a mask area. The pair of lateral edge positions E1 are the positions of both ends in the width direction D2 of the sheet 9 passing through the detection area A1 (see FIG. 4). The sheet area is an area within a rectangular outline of the sheet 9.

The image processing circuit 53 detects the pair of lateral edge positions E1 by performing an edge detection process in the width direction D2 on each of the line data.

Furthermore, the image processing circuit 53 detects a leading edge and a trailing edge of the sheet 9 by performing an edge detection process in the conveying direction D1 on each of the line data. The image processing circuit 53 specifies the sheet area based on the detection results of the pair of lateral edge positions E1, the leading edge of the sheet 9, and the trailing edge of the sheet 9.

Furthermore, the image processing circuit 53 identifies a portion of the sheet area where the detected light amount is less than the reference light amount as the mask area.

In a case where an opening 90 such as a punch hole is formed in the sheet 9, a part of the reference surface 51*a* is exposed to the image sensor unit 52 side through the opening 90 (see FIG. 4). Therefore, the area of the opening 90 in the sheet 9 is detected as the mask area.

The interference position specifying process is executed when the reference image data is supplied to the image processing circuit 53. The interference position specifying process is a process of specifying a position of an interference portion that overlaps with the mask area in a reference image represented by the supplied reference image data. In the following description, the position of the interference portion specified by the image processing circuit 53 will be referred to as an interference position.

In the image forming apparatus 10, the reference center position SC1 representing the center position in the width direction D2 in the detection area A1 is preset (see FIG. 4).

The reference center position SC1 is associated with the print center position, which is the center position in the width direction D2 in the print width area. The print width area is an area in the width direction D2 in which the printing device 4 can form an image.

In the following description, the center position of the pair of lateral edge positions E1 will be referred to as a sheet center position PC1 (see FIG. 4). The sheet center position PC1 is the center position in the width direction D2 of the sheet 9 passing through the detection area A1.

A situation in which the sheet center position PC1 matches the reference center position SC1 is a situation in which the sheet 9 is being conveyed at a predetermined position in the width direction D2.

The printing control portion 8*b* executes a width position correction process and a mask process every time one sheet 9 is conveyed.

The width position correction process is a process of correcting the position of the print target image in the width direction D2 according to a position difference DX1 that is the difference between the sheet center position PC1 and the reference center position SC1 (see FIG. 4).

The mask process is a process that supplies data of the print target image that has been subjected to the width position correction process to the image processing circuit 53 as the reference image data, and replaces pixels corresponding to the interference position in the print target image with non-print pixels. The non-print pixels are pixels that are not drawn with ink.

The area detection process, the interference position specifying process, the width position correction process, and the mask process need to be completed while the sheet 9 is conveyed from the detection area A1 to the position of the printing device 4. The area detection process and the interference position specifying process are achieved by hardware to speed up the processing.

The printing control portion 8*b* causes the printing device 4 to execute the printing process on the print target image, which has been subjected to the width position correction process and the mask process for each sheet 9. Thus, the print target image is formed on the sheet 9 at an appropriate position in the width direction D2. Furthermore, ejection of ink into the area of the openings 90 in the sheet 9 is avoided.

However, in a case where the reference center position SC1 in the edge detection device 5 deviates from the print center position in the printing device 4, the print target image may be formed at a position biased to one side in the width direction D2 on the sheet 9.

The plurality of processing modules of the CPU 80 further include a calibration portion 8*c*. The printing control portion 8*b* and the calibration portion 8*c* execute a center position calibration process, which will be described later (see FIG. 8). The center position calibration process is a process for correcting the deviation of the reference center position SC1 from the print center position.

In a conventional device, test images including a plurality of scale images may be formed on both surfaces of the sheet 9 in order to correct the deviation of the reference center position SC1. In this case, the conventional device corrects the deviation of the reference center position SC1 according to the overlapping state of the plurality of scale images on both surfaces of the sheet 9 when the sheet 9 is transparentized.

The overlapping state of the plurality of scale images on both surfaces of the sheet is visually confirmed.

In a case where the overlapping state of the plurality of scale images on both surfaces of the sheet 9 is visually confirmed, an error in the visual confirmation may adversely affect the correction of the deviation of the reference center position SC1.

The image forming apparatus 10 includes a configuration for accurately setting the center position in the width direction D2 of the detection area A1 based on the test image formed on the sheet 9 without requiring visual confirmation of the image. The configuration will be explained below.

In the following description, the sheet 9 used for the center position calibration process will be referred to as a target sheet 9*x* (see FIGS. 5 to 7).

In the present embodiment, the main control portion 8*a* switches the operation mode of the image forming apparatus 10 from the normal mode to the calibration mode when a calibration start operation is detected by the operation device 801. The initial state of the operation mode is the normal mode.

The center position calibration process is executed when the operation mode is the calibration mode. When the central calibration process is completed, the main control portion 8*a* returns the operation mode from the calibration mode to the normal mode.

When the operation mode is the normal mode, the printing control portion 8*b* executes two processes, the width position correction process and the mask process, on the print target image for each sheet 9, and then causes the printing device 4 to execute the printing process on the print target image that has been subjected to the two processes.

The mask process for the print target image is a mask process based on the interference position obtained by the interference position specifying process using data of the print target image as the reference image data.

As described above, the position of the print target image in the width direction D2 is corrected by the width position correction process. Furthermore, the mask process prevents ink from being ejected onto the reference surface 51*a* of the black reference member 51.

The calibration mode is an example of a first mode, and the normal mode is an example of a second mode.

[Center Position Calibration Process]

In the following, an example of a procedure of the center position calibration process will be described with reference to the flowchart shown in FIG. 7.

The center position calibration process is an example of a process that achieves the image forming control method for controlling the image forming apparatus 10. The CPU 80 is an example of a processor that achieves the image forming control method.

In the following description, S1, S2, and so on represent identification codes of a plurality of steps in the center position calibration process. In the center position calibration process, first, the process of step S1 is executed.

<Step S1>

In step S1, the printing control portion 8*b* executes control to stop power supply to the heater 431 of the drying device 43.

After executing the process of step S1, the printing control portion 8*b* moves the process to step S2. The processes from step S2 on are executed while power supply to the heater 431 is stopped.

<Step S2>

In step S2, the calibration portion 8*c* determines whether or not the temperature of the drying device 43 satisfies an allowable temperature condition.

The allowable temperature condition is a condition in which the temperature detected by the temperature sensor 430 of the drying device 43 does not exceed a preset allowable temperature. In step S2, the calibration portion 8*c* acquires the temperature detected by the temperature sensor 430, and further determines whether or not the detected temperature satisfies the allowable temperature condition.

The allowable temperature condition is determined in order to avoid shrinkage of the target sheet 9*x* when passing through the drying device 43.

The calibration portion 8*c* causes the processing to proceed to step S3 when the temperature of the drying device 43 does not satisfy the allowable temperature condition. On the other hand, the calibration portion 8*c* causes the processing to proceed to step S4 when the temperature of the drying device 43 satisfies the allowable temperature condition.

<Step S3>

In step S3, the calibration portion 8*c* executes an error notification to give notification of predetermined error information via the display device 802.

For example, the error information is information indicating that the temperature of the drying device 43 does not satisfy the allowable temperature condition, and what the user should do in order for the temperature of the drying device 43 to satisfy the allowable temperature condition.

After executing the process of step S3, the calibration portion 8*c* ends the center position calibration process. Note that the calibration portion 8*c* may repeat the processes of step S2 and step S3 until the temperature of the drying device 43 satisfies the allowable temperature condition.

In a case where the temperature of the drying device 43 does not satisfy the allowable temperature condition, the printing control portion 8*b* may operate the fan 432 while stopping power supply to the heater 431 of the drying device 43. Thus, cooling of the drying device 43 is promoted.

The processes from step S4 on shown below are executed on the condition that the temperature of the drying device 43 satisfies the allowable temperature condition.

<Step S4>

In step S4, the printing control portion 8*b* causes the sheet conveying device 3 to execute a first conveying process of conveying the target sheet 9*x* with a specific surface 9*a* of the target sheet 9*x* serving as the printing surface.

The specific surface 9*a* of the target sheet 9*x* to be subjected to the first conveying process is a blank surface on which no image is formed. While the first conveying process is being executed, the processes of step S5 and step S6 are executed.

<Step S5>

In step S5, the calibration portion 8*c* acquires data on the pair of first lateral edge positions detected by the sheet measuring device 5 at a timing when the target sheet 9*x* passes through the detection area A1.

The pair of first lateral edge positions are the pair of lateral edge positions E1 obtained by the area detection process of the sheet measuring device 5 when the target sheet 9*x* is conveyed by the first conveyance process.

After executing the process of step S5, the calibration portion 8*c* moves the process to step S6.

<Step S6>

Figure 5:
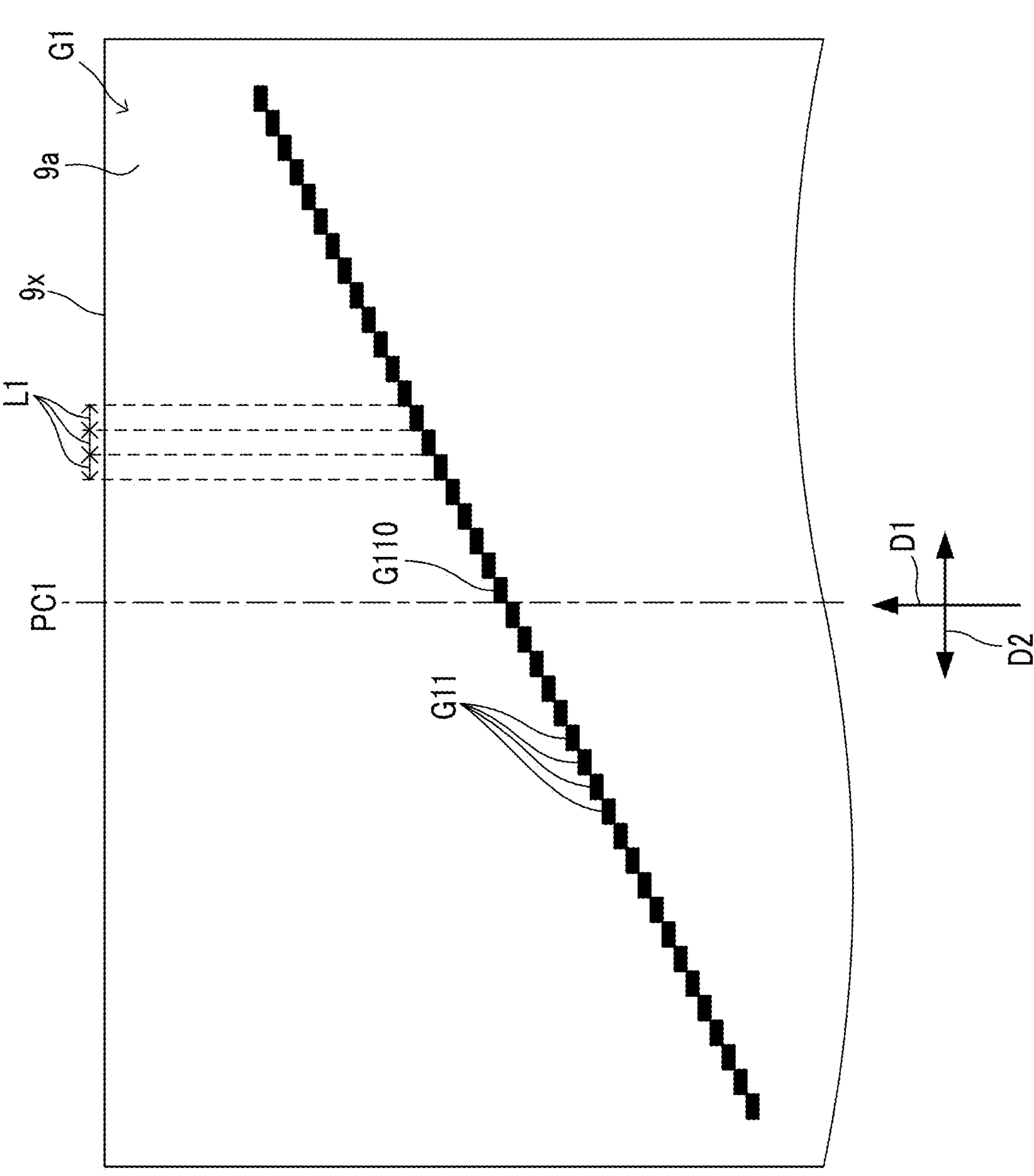
FIG. 5 is a diagram illustrating an example of a first test image formed on a target sheet in an image forming apparatus according to an embodiment.
Figure 7:
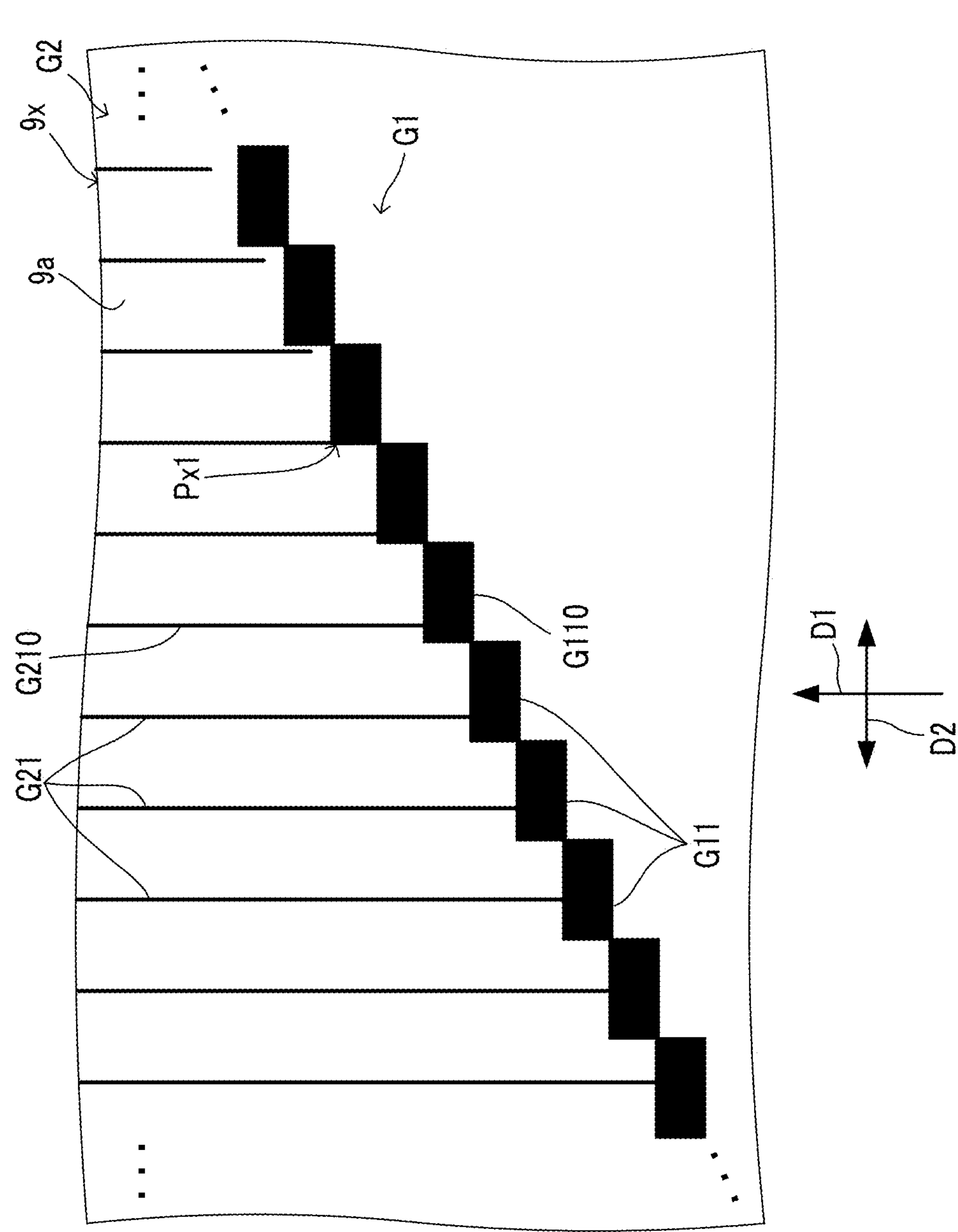
FIG. 7 is an enlarged view of a portion of a first test image and a second test image.

In step S6, the printing control portion 8*b* causes the printing device 4 to execute a process of forming a first test image G1 including a plurality of black patch images G11 on the specific surface 9*a* of the target sheet 9*x* (see FIGS. 5 and 7).

The plurality of black patch images G11 in the first test image G1 are rectangular black painted images each having a width of a first length L1 (see FIGS. 5 and 7). The first length L1 is a predetermined reference length.

In the present embodiment, data representing a first reference test image is stored in the secondary storage device 82 in advance. The first reference test image includes a plurality of black patch images G11 arranged in a stepwise manner in the width direction D2 at a pitch of a first length L1 with the reference center position SC1 as a reference while the positions in the conveying direction D1 are sequentially shifted.

The plurality of black patch images G11 are arranged in a step-like manner sequentially shifted from a first side to a second side in the width direction D2 toward the upstream side in the conveying direction D1 (see FIG. 5). In the examples shown in FIGS. 5 to 7, the first side in the width direction D2 is the right side when facing the page, and the second side in the width direction D2 is the left side when facing the page.

In step S6, the printing control portion 8*b* executes the width position correction process on the first reference test image.

That is, the printing control portion 8*b* corrects the position in the width direction D2 of the first test image G1 based on the reference center position SC1 according to the difference between the sheet center position PC1 at the center of the pair of first lateral edge positions obtained in step S5 and the reference center position SC1.

The printing control portion 8*b* sets the image whose position in the width direction D2 has been corrected by the width position correction process as the first test image G1.

The plurality of black patch images G11 include a reference black patch image G110 (see FIGS. 5 and 7). The reference black patch image G110 is one of the plurality of black patch images G11 that is located at the center in the width direction D2.

In the first reference test image, a specific side, which is one of the two sides of the reference black patch image G110, is located at the reference center position SC1. In the examples shown in FIGS. 5 and 7, the specific side is the left side of the reference black patch image G110.

In the first test image G1 obtained by the width position correction process, the specific side of the reference black patch image G110 is located at the sheet center position PC1 at the center of the pair of first lateral edge positions (see FIG. 5).

That is, in the first test image G1 formed on the specific surface 9*a* of the target sheet 9*x* in step S6, the plurality of black patch images G11 are arranged stepwise at a pitch of a first length L1 in the width direction D2 with the sheet center position PC1 at the center of the pair of first lateral edge positions as a reference in a state in which the positions in the conveying direction D1 are sequentially shifted (see FIG. 5).

After executing the process of step S6, the printing control portion 8*b* moves the process to step S7.

<Step S7>

In step S7, the printing control portion 8*b* causes the sheet conveying device 3 to execute a second conveying process of conveying the target sheet 9*x* in a state where the specific surface 9*a* of the target sheet 9*x* on which the first test image G1 is formed serves as the printing surface.

For example, in step S7, the main control portion 8*a* sends a 'set target sheet' notification message via the display device 802. The 'set target sheet' message is a message prompting to set the target sheet 9*x* in the sheet storing portion 1 so that the specific surface 9*a* of the target sheet 9*x* on which the first test image G1 is formed becomes the printing surface.

When the operation device 801 detects a conveying start operation corresponding to the 'set target sheet' message, the printing control portion 8*b* causes the sheet conveying device 3 to execute the second conveying process for the target sheet 9*x* set in the sheet storing portion 1.

When the second conveying process is executed, the plurality of black patch images G11 in the first test image G1 form a pseudo region of the opening 90 in the target sheet 9*x*.

That is, the image processing circuit 53 executes the area detection process corresponding to the second conveying process, and detects the areas of the plurality of black patch images G11 as the mask area.

After executing the process of step S7, the printing control portion 8*b* moves the process to step S8. While the second conveying process is being executed, the processes of step S8 and step S9 are executed.

<Step S8>

In step S8, the calibration portion 8*c* acquires data regarding the pair of second lateral edge positions from the sheet measuring device 5 at timing when the target sheet 9*x* passes through the detection area.

The pair of first lateral edge positions are the pair of lateral edge positions E1 obtained by the area detection process of the sheet measuring device 5 when the target sheet 9*x* is conveyed by the second conveying process.

After executing the process of step S8, the calibration portion 8*c* moves the process to step S9.

<Step S9>

Figure 6:
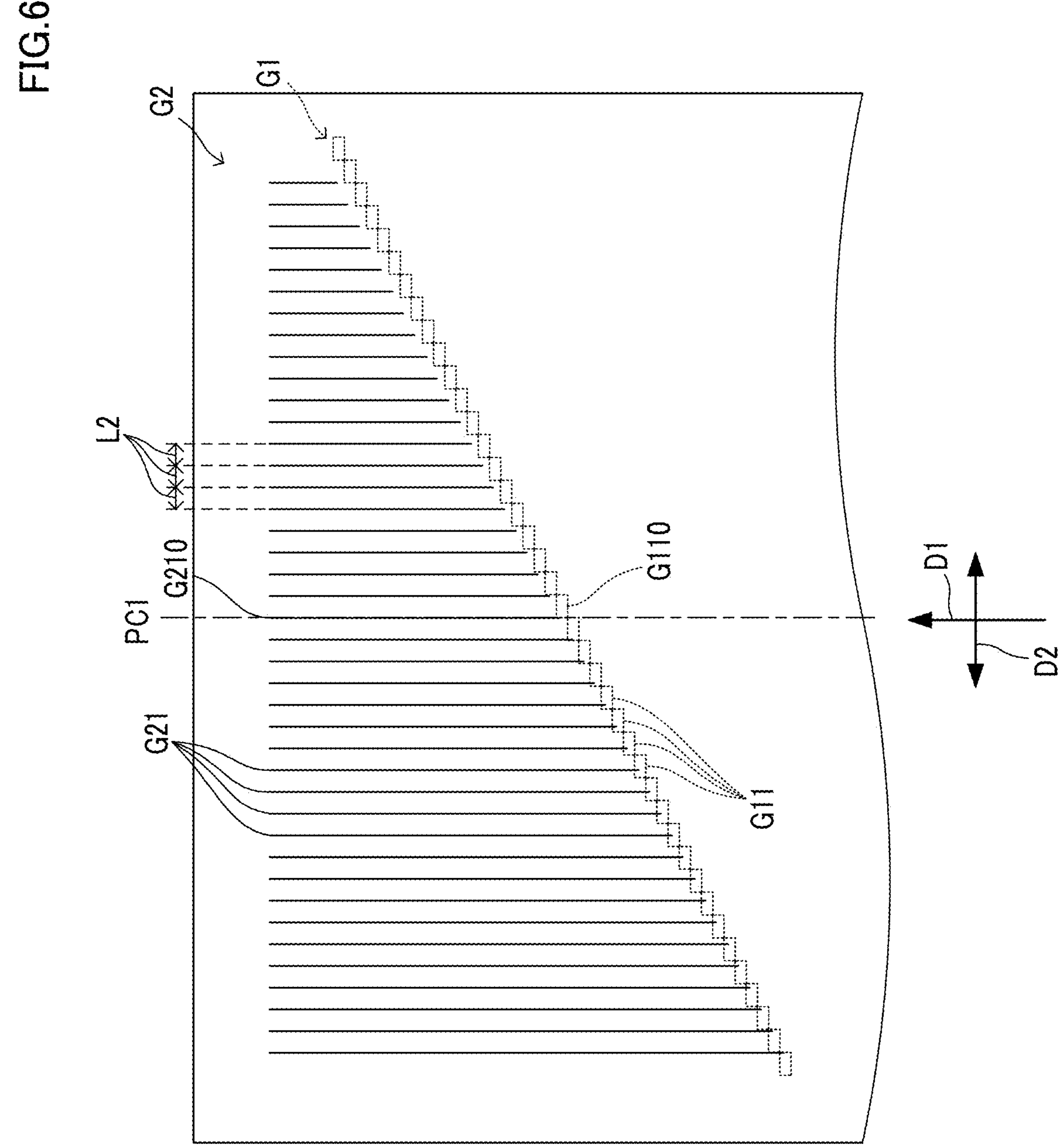
FIG. 6 is a diagram illustrating an example of a second test image represented by reference image data supplied to a sheet measuring device in an image forming apparatus according to an embodiment.

In step S9, the printing control portion 8*b* supplies data of the second test image G2 including a plurality of line segment images G21 along the conveying direction D1 to the image processing circuit 53 as the reference image data (see FIG. 6).

The plurality of line segment images G21 in the second test image G2 correspond to the plurality of black patch images G11 in the first test image G1. For convenience, in FIG. 6, the plurality of black patch images G11 of the first test image G1 are indicated by dashed lines.

The plurality of line segment images G21 in the second test image G2 are arranged at equal intervals of a second length L2 in the width direction D2 with reference to the sheet center position PC1, which is the center of the pair of second lateral edge positions.

The second length L2 is smaller than the first length L1. More specifically, the second length L2 is shorter than the first length L1 by one pixel.

An end portion of each of the plurality of line segment images G21 is formed at a position overlapping a corresponding one of the plurality of the black patch images G11 in the conveying direction D1.

For example, the first end portion of each of the plurality of line segment images G21 is formed at a downstream side position in the conveying direction D1 with respect to all of the plurality of black patch images G11 (see FIG. 6). The downstream side in the conveying direction D1 is the leading end side of the target sheet 9*x* being conveyed.

On the other hand, the second end portion of each of the plurality of line segment images G21 is formed at the center position of the corresponding one of the plurality of black patch images G11 in the conveying direction D1 (see FIG. 6).

In the present embodiment, data representing a second reference test image is stored in the secondary storage device 82 in advance. The second reference test image includes a plurality of line segment images G21 arranged at equal intervals of a second length L2 in the width direction D2 with reference to the reference center position SC1.

In step S9, the printing control portion 8*b* executes the width position correction process on the second reference test image.

That is, the printing control portion 8*b* corrects the position in the width direction D2 of the second reference test image based on the reference center position SC1 according to the difference between the sheet center position PC1 at the center of the pair of first lateral edge positions obtained in step S8 and the reference center position SC1.

The printing control portion 8*b* sets the image whose position in the width direction D2 has been corrected by the width position correction process as the second test image G2.

The plurality of line segment images G21 include a reference line segment image G210 (see FIG. 6). The reference line segment image G210 is one of the plurality of line segment images G21 that is located at the center in the width direction D2.

In the second reference test image, the reference line segment image G210 is located at the reference center position SC1. On the other hand, in the second test image G2 obtained by the width position correction process, the reference line segment image G210 is located at the sheet center position PC1, which is the center of the pair of second lateral edge positions (see FIG. 6).

That is, the plurality of line segment images G21 corresponding to the reference image data supplied to the image processing circuit 53 in step S9 are arranged at equal intervals of a second length L2 in the width direction D2 with reference to the sheet center position PC1, which is the center of the pair of second lateral edge positions.

After executing the process of step S9, the printing control portion 8*b* moves the process to step S10.

<Step S10>

In step S10, the calibration portion 8*c* acquires information on a test interference position from the image processing circuit 53. The test interference position is the interference position specified by the image processing circuit 53 based on the mask area corresponding to the second conveying process and data of the second test image G2.

As described above, the mask area corresponding to the second conveying process is the area of the plurality of black patch images G11 in the first test image G1. Therefore, the test interference position is a position where a part of the plurality of black patch images G11 and a part of the plurality of line segment images G21 interfere.

In the present embodiment, the calibration portion 8*c* acquires from the image processing circuit 53 a target test interference position Px1, which is the most downstream test interference position in the conveying direction D1 (see FIG. 7).

When the reference center position SC1 matches the print center position, the position where the reference black patch image G110 and the reference line segment image G210 interfere is specified as the target test interference position Px1 (see FIG. 6).

However, in a case where the reference center position SC1 deviates from the print center position toward the first side in the width direction D2, the first test image G1 is formed at a position deviated farther toward the second side in the width direction D2 than a state where the reference black patch image G110 and the reference line segment image G210 interfere.

Similarly, in a case where the reference center position SC1 deviates from the print center position toward the second side in the width direction D2, the first test image G1 is formed at a position deviated farther toward the first side in the width direction D2 than a state where the reference black patch image G110 and the reference line segment image G210 interfere.

In the example shown in FIG. 7, the target test interference position Px1 is a position where one of the plurality of black patch images G11 arranged second on the first side in the width direction D2 with respect to the reference black patch image G110 and one of the plurality of line segment images G21 arranged second on the right side in the width direction D2 with respect to the reference line segment image G210 interfere.

In the present embodiment, a difference between the first length L1 and the second length L2 is the length of one pixel. Therefore, FIG. 7 shows an example in a case where the reference center position SC1 deviates from the print center position by two pixels to the left in the width direction D2.

That is, the calibration portion 8*c* determines the direction and size of deviation of the reference center position SC1 from the print center position by specifying which of the plurality of line segment images G21 the target test interference position Px1 corresponds to.

After executing the process of step S10, the calibration portion 8*c* moves the process to step S11.

<Step S11>

In step S11, the calibration portion 8*c* corrects the reference center position SC1 according to the target test interference position Px1, and sets the corrected reference center position SC1 as a new reference center position SC1.

More specifically, the plurality of line segment images G21 are assigned to a plurality of identification values that increase by one according to the arrangement order from a first side to a second side in the width direction D2. Of the plurality of identification values, the value corresponding to the reference line segment image G210 is 0.

In a case where the number of line segment images G21 is (2N+1), the plurality of identification values are integers from −N to +N. In the example shown in FIG. 7, of the plurality of identification values, the value corresponding to the target test interference position Px1 is −2.

In step S11, the calibration portion 8*c*, of the plurality of identification values, specifies a value corresponding to the target test interference position Px1 as the corrected pixel number of the reference center position SC1.

The reference center position SC1 is represented by a pixel position in the width direction D2. The calibration portion 8*c* sets a position obtained by correcting the original reference center position SC1 by the corrected number of pixels as a new reference center position SC1. The calibration portion 8*c* records information on the corrected reference center position SC1 in the secondary storage device 82.

After executing the process of step S11, the calibration portion 8*c* ends the center position calibration process. When the center position calibration process is completed, the main control portion 8*a* returns the operation mode from the calibration mode to the normal mode.

When the operation mode is the normal mode, the printing control portion 8*b* executes the width position correction process and the mask process for each sheet 9. In the width position correction process, the corrected reference center position SC1 is used. Furthermore, in the normal mode, the printing control portion 8*b* causes the printing device 4 to execute a process of forming the print target image, which has been subjected to the width position correction process and the mask process, on the sheet 9.

By executing the center position calibration process, it is possible to accurately set the reference center position SC1 based on the test image formed on the target sheet 9*x* without requiring visual confirmation of the image.

APPLICATION EXAMPLE

Next, an application example of the image forming apparatus 10 will be described with reference to FIG. 9.

When the center position calibration process is executed, power supply to the heater 431 of the drying device 43 is stopped. Furthermore, the processes from step S4 on in the central position calibration process are executed on the condition that the temperature of the drying device 43 satisfies the allowable temperature condition.

However, in order to shorten the time required for the adjustment process of the image forming apparatus 10, it may be necessary to set the allowable temperature of the allowable temperature condition to a relatively high temperature. In this case, there is a risk that the target sheet 9*x* may shrink due to the heat received from the heater 431 in the first conveying process.

[Second Test Image Data Supply Process]

Figure 9:
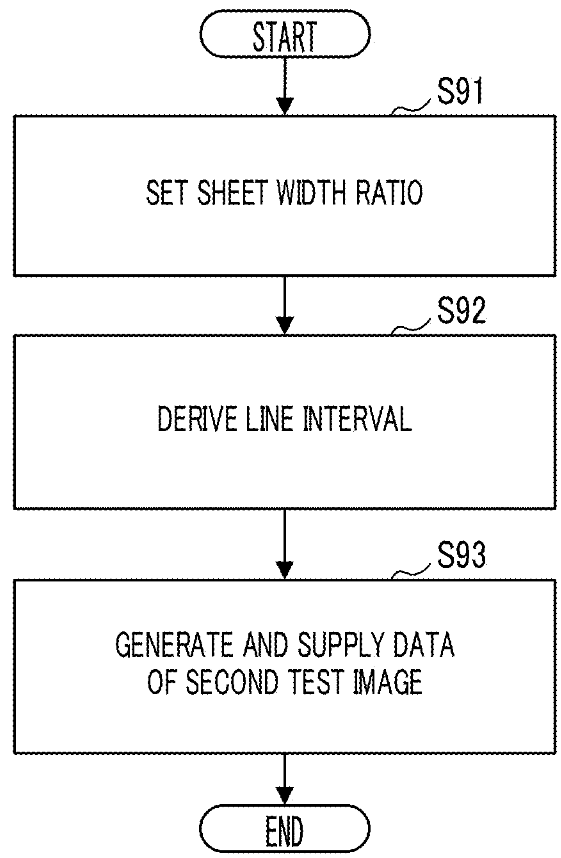
FIG. 9 is a flowchart illustrating an example of a procedure of a second test image data supply process in an image forming apparatus according to an application example.

The flowchart shown in FIG. 9 shows an example of a procedure of the second test image data supply process, which is an application example of the process executed in step S9 of FIG. 8.

In the following description, steps S91 to S93 represent identification codes of three steps in the second test image data supply process. In the second test image data supply process, first, the process of step S91 is executed.

<Step S91>

In step S91, the calibration portion 8*c* derives a first sheet width and a second sheet width, and further derives a sheet width ratio that is a ratio of the second sheet width to the first sheet width.

The first sheet width is the distance between the pair of first lateral edge positions obtained in step S5. The first sheet width is the distance between the pair of second lateral edge positions obtained in step S8.

In a case where the target sheet 9*x* shrinks due to passing through the drying device 43 when the first conveying process is executed, a sheet width ratio that is less than 1 is derived.

After executing the process of step S91, the calibration portion 8*c* moves the process to step S92.

Note that in a case where the sheet width ratio exceeds 1, the calibration portion 8*c* outputs an error notification and then ends the second test image data supply process and the center position calibration process.

<Step S92>

In step S92, the calibration portion 8*c* derives the line interval by correcting the second length L2 corresponding to the first length L1 using the sheet width ratio. The line interval is an interval in the width direction D2 between the plurality of line segment images G21 in the second test image G2. The second length L2 is an example of a reference interval.

In a case where the target sheet 9*x* on which the first test image G1 is formed has shrunk, the dimension of each black patch image G11 in the width direction D2 and the pitch of the plurality of black patch images G11 in the width direction D2 will become smaller according to the shrinkage rate of the target sheet 9*x*.

The process in step S92 is a process of correcting the intervals in the width direction D2 of the plurality of line segment images G21 so as to match the dimensions in the width direction D2 of the plurality of black patch images G11.

After executing the process of step S92, the calibration portion 8*c* moves the process to step S93.

<Step S93>

In step S93, the calibration portion 8*c* generates data of a second test image G2 including a plurality of line segment images G21 arranged at the line intervals in the width direction D2 with the center position of the pair of second lateral edge positions obtained in step S8 as a reference.

Furthermore, the calibration portion 8*c* supplies the generated data of the second test image G2 to the image processing circuit 53 as the reference image data.

After executing the process of step S93, the calibration portion 8*c* ends the second test image data supply process. Continuing, the calibration portion 8*c* executes the processes from step S10 onwards (see FIG. 8).

By executing the second test image data supply process, correction of the reference center position SC1 reflecting the sheet width ratio is performed (see steps S10 and S11). The sheet width ratio represents a shrinkage rate of the target sheet 9*x* due to passing through the drying device 43.

Therefore, by employing the application example, shrinkage of the target sheet 9*x* due to passing through the drying device 43 is prevented from adversely affecting the correction of the reference center position SC1.

By employing the application example, even in a case where the center position calibration process is executed without waiting until the temperature of the drying device 43 drops to room temperature, an adverse effect of shrinkage of the target sheet 9*x* on the correction of the reference center position SC1 will be prevented.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming control method for controlling an image forming apparatus, comprising:

a sheet conveying device configured to convey a sheet along a conveying path;

a printing device configured to form an image on the sheet conveyed along the conveying path by ejecting ink onto the sheet;

a black reference member having a black reference surface arranged along a width direction crossing a sheet conveying direction and facing a detection area on an upstream side in the sheet conveying direction with respect to the printing device in the conveying path;

an image sensor unit arranged along the width direction in a state of facing the reference surface through the detection area, and configured to emit detection light toward the reference surface and detect an amount of reflected light of the detection light; and output a plurality of line image data each including a plurality of pixel data representing detected light amounts corresponding to a plurality of unit areas divided in the width direction in the detection area;

an image processing device configured to execute image processing based on the plurality of line image data; and a drying device that is arranged downstream of the printing device in the sheet conveying direction, and has a heater that heats the sheet and dries the ink on the sheet; wherein the image processing device is capable of executing an area detection process of detecting a pair of lateral edge positions that are positions of both ends in the width direction of the sheet passing through the detection area, a sheet area that is an area within a rectangular outline of the sheet, and a mask area that is a portion of the sheet area where the detected light amount is lower than a reference light amount;

the image processing device is further capable of executing an interference position specifying process for specifying a position of an interference portion that overlaps with the mask area in a reference image represented supplied reference image data;

the image forming control method comprising:

a processor, when an operation mode is a first mode, causing the sheet conveying device to execute a first conveying process of conveying a target sheet in a state where a specific surface of the target sheet serves as a printing surface;

the processor acquiring information on a pair of first lateral edge positions that are the pair of lateral edge positions detected by the image processing device when the first conveying process is being executed;

the processor causing the printing device to execute a process of forming a first test image including a plurality of black patch images on the specific surface when the first conveying process is being executed;

the processor causing the sheet conveying device to execute a second conveying process of conveying the target sheet with the specific surface on which the first test image is formed as a printing surface;

the processor acquiring information on a pair of second lateral edge positions that are the pair of lateral edge positions detected by the image processing device when the second conveying process is being executed;

the processor supplying second test image data, which corresponds to the plurality of black patch images and includes a plurality of line segment images each along the sheet conveying direction, to the image processing device as the reference image data, and acquiring information on a test interference position that is a position of the interference portion specified by the image processing device based on the mask area corresponding to the second conveying process and data of the second test image;

the processor setting a reference center position that is a center position of the image sensor unit in the width direction according to the test interference position;

the processor, when the operation mode is a second mode, executing a width position correction process of correcting a position in the width direction of a print target image each time the sheet is conveyed according to a difference between a center position of the pair of lateral edge positions detected by the image processing device each time the sheet is conveyed and the reference center position;

the processor supplying data of the print target image that has been subjected to the width position correction process to the image processing device as the reference image data, and executing a mask process in which pixels corresponding to the position of the interference portion identified by the image processing device in the print target image are replaced with non-print pixels; and the processor causing the printing device to execute a process of forming the print target image, which has been subjected to the width position correction process and the mask process, on the sheet; wherein the plurality of black patch images in the first test image are arranged at a pitch of a reference length in the width direction with respect to the center position of the pair of first lateral edge positions in a state in which the positions in the sheet conveying direction are sequentially deviated, and are rectangular black-painted images arranged in a stepwise manner, each having a width equal to the reference length;

the plurality of line segment images in the second test image are arranged at regular intervals smaller than the reference length in the width direction with respect to the center position of the pair of second lateral edge positions, and an end portion of each of the plurality of line segment images is formed at a position overlapping a corresponding one of the plurality of black patch images in the sheet conveying direction; and the image forming control method further comprises:

the processor deriving a line interval that is an interval in the width direction of the plurality of line segment images by correcting a reference interval corresponding to the reference length by a ratio of an interval between the pair of second lateral edge positions to an interval between the pair of first lateral edge positions; and the processor generating data of the second test image including the plurality of line segment images arranged at the line intervals in the width direction with the center position of the pair of second lateral edge positions as a reference.

2. The image forming control method according to claim 1, wherein the image forming apparatus further comprises a temperature sensor configured to detect a temperature of the drying device; and the processor, when the operation mode is the first mode, causes the sheet conveying device to execute a process of conveying the target sheet on the condition that a temperature detected by the temperature sensor does not exceed a preset allowable temperature.

3. An image forming apparatus, comprising:

a sheet conveying device configured to convey a sheet along a conveying path;

a printing device configured to form an image on the sheet conveyed along the conveying path;

a black reference member having a black reference surface arranged along a width direction crossing a sheet conveying direction and facing a detection area on an upstream side in the sheet conveying direction with respect to the printing device in the conveying path;

an image sensor unit arranged along the width direction in a state of facing the reference surface through the detection area, and configured to emit detection light toward the reference surface and detect an amount of reflected light of the detection light; and output a plurality of line image data each including a plurality of pixel data representing detected light amounts corresponding to a plurality of unit areas divided in the width direction in the detection area;

an image processing device, that by executing image processing based on the plurality of line image data, is capable of executing an area detection process of detecting a pair of lateral edge positions that are positions of both ends in the width direction of the sheet passing through the detection area; a sheet area that is an area within a rectangular outline of the sheet; and a mask area that is a portion in the sheet area where the detected light amount is lower than a reference light amount; and is further capable of executing an interference position specifying process of specifying a position of an interference portion that overlaps with the mask area in a reference image represented by supplied reference image data; and a processor configured to achieve an image forming control method according to claim 1.

* * * * *